May 25, 1954     H. C. CHRISTIANCE     2,679,132
GATHERING WHEEL FOR CORN HARVESTERS
Filed May 1, 1950
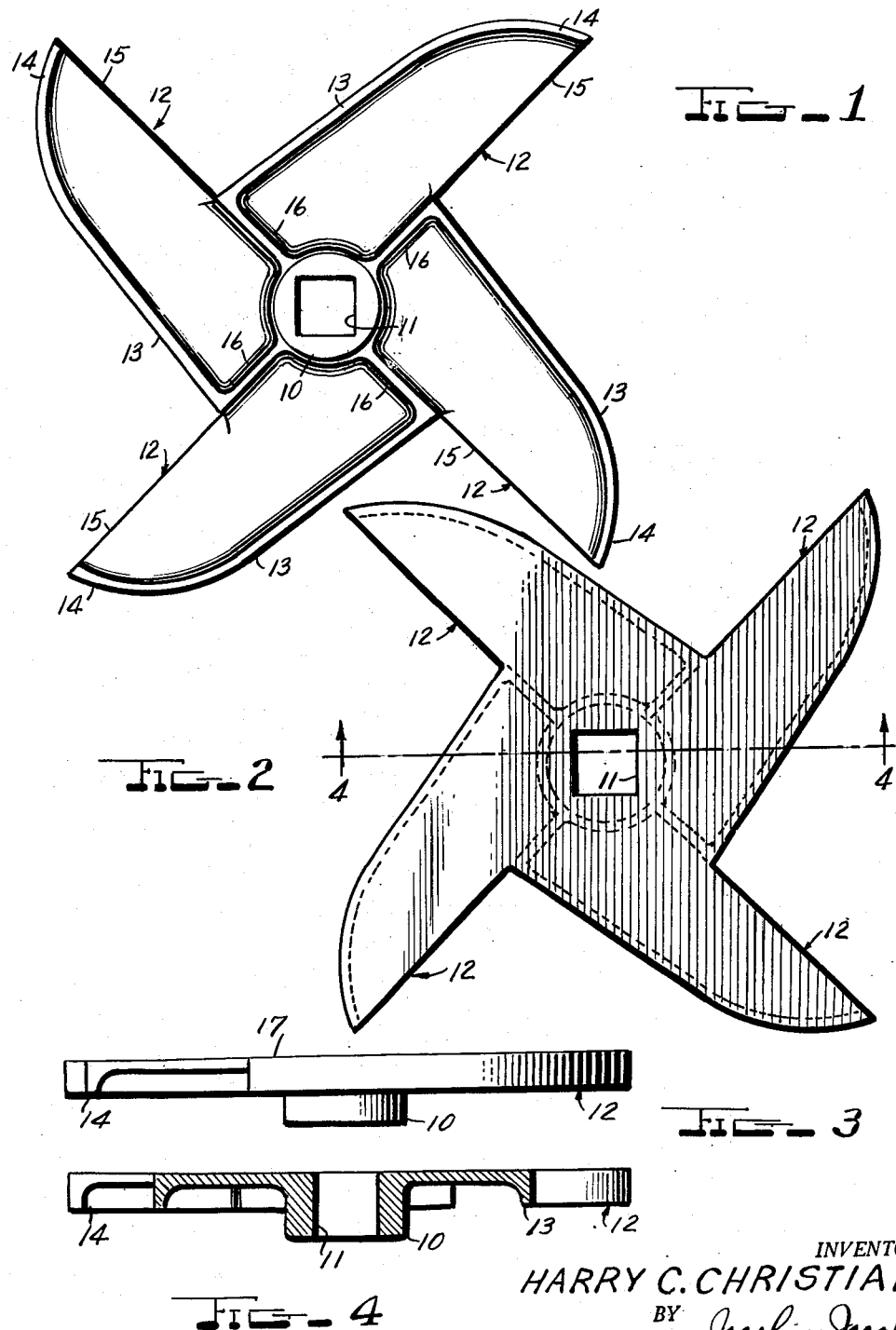
INVENTOR.
HARRY C. CHRISTIANCE
BY Jacobi & Jacobi
ATTORNEYS Patented May 25, 1954

2,679,132

UNITED STATES PATENT OFFICE 2,679,132

GATHERING WHEEL FOR CORN HARVESTERS

Harry C. Christiance, West Brooklyn, Ill.

Application May 1, 1950, Serial No. 159,363

2 Claims. (Cl. 56—119)

This invention relates to agriculture and more particularly to harvesting apparatus for separating ears of corn from the stalks and for removing the husks therefrom. This invention is primarily concerned with a gathering wheel for use in a corn harvester of the type shown in my prior Patent No. 1,911,491.

The gathering wheel of this invention has been developed to facilitate the design and construction of harvesting apparatus of the type disclosed in the above mentioned patent and this wheel makes possible a simplified and more efficient harvesting apparatus which is more efficient in operation and less costly to manufacture than prior art apparatus of this nature.

It is accordingly an object of this invention to provide a gathering wheel for corn harvesting apparatus which will eliminate disadvantages and limitations inherent in previous apparatus of this type.

A further object of the invention is to provide a gathering wheel for corn harvesting apparatus which will serve to feed the stalks into the apparatus in a rapid and effective manner and without undue damage to the corn.

A still further object of the invention is the provision of a gathering wheel for corn harvesting apparatus which will operate efficiently without clogging or tilting, resulting in increased capacity for the apparatus and eliminating loss of operating time due to breakage of parts.

Further objects and advantages of the invention will be apparent from the following description taken in conjunction with the accompanying drawing wherein:

Fig. 1 is a bottom plan view of a gathering wheel constructed in accordance with this invention;

Fig. 2, a top plan view of the gathering wheel shown in Fig. 1;

Fig. 3, a side elevational view of the gathering wheel shown in Figs. 1 and 2; and Fig. 4, a sectional view taken on the line 4—4 of Fig. 2.

With continued reference to the drawing, the gathering wheel of this invention may well comprise a flat body having a hub 10 having an aperture 11 therethrough for mounting the wheel on a shaft for rotation therewith. The aperture 11 is shown in a drawing as rectangular in cross-section, but this aperture may be of any desired polygonal shape which will permit mating with a similar shape on a shaft to prevent relative rotation therebetween, or if desired, the aperture 11 may be circular and provided with a keyway and key in order to prevent such relative rotation between the wheel and a shaft on which it may be mounted.

Extending outwardly from the hub 10 an integral therewith are four blades or fingers 12 which are equally and symmetrically disposed about the axis of the wheel and with each blade having a flange 13 extending downwardly from the leading edge of such blade. The leading edge and flange 13 is curved at the outer end thereof as at 14 and the blade terminates at its outer end at a straight trailing edge 15, which extends radially of the wheel. The flange 13 on each blade terminates at its inner end in a radially disposed flange portion 16 which extends inwardly and integrally joins the hub 10.

The above described structure provides a gathering wheel for corn harvesters which presents a flat, uninterrupted upper surface 17 and which is of extremely rugged construction. It is to be noted, that the flange 13 on the leading edge of each blade 12 serves to reinforce and strengthen each blade and to also provide a relatively thick wearing surface which is in direct contact with the cornstalks. It is also to be noted, that the radial connecting flanges 16 also serve to materially reinforce the structure.

In use a plurality of gathering wheels constructed in accordance with this invention are arranged in rows opposite each other in staggered relationship in order for the blades to intermesh which will facilitate engaging and conveying cornstalks into the harvesting apparatus. The gathering wheels are arranged to rotate in a horizontal plane and are so timed that the curved flanges 14 on the blades 12 progressively engage the cornstalks and convey them into and through the apparatus for removing the ears and the husks. Also, if desired, the finger wheels of this invention may be arranged in overlapping relationship and this is materially facilitated by the flat, uninterrupted surfaces 17 on such wheels.

The improved gathering wheel described above, permits the design and construction of a more compact harvesting apparatus and such wheels may be inter-changed or reversed and will efficiently handle materials, such as cornstalks, even though the same may be wet and soggy, which often causes jamming and breakage of such apparatus.

It will be obvious to those skilled in the art that various changes may be made in the invention without departing from the spirit and scope thereof and therefore, the invention is not limited by that which is shown in the drawing and

I claim:

1. A gathering wheel for a corn harvester comprising a flat body having a hub at its center projecting from one surface of the body and formed with an axially extending shaft-receiving opening, said body having fingers spaced from each other circumferentially thereof and arranged in pairs disposed at opposite sides of the hub in transversely offset parallel relation to each other, the fingers of each pair being disposed laterally of another oppositely disposed pair with their inner ends in abutting relation thereto, each finger having a side edge straight throughout its length and at its opposite side having an edge straight for a portion of its length from its inner end and merging into a longitudinally arcuate portion curved towards and intersecting the outer end of the straight side edge, the last mentioned side edge being bordered by a flange projecting from the finger in the same direction as the hub projects from the body and at the inner end of the finger having a portion extending laterally therefrom across the body radially of the hub and integrally united therewith.

2. A gathering wheel for a corn harvester comprising a flat body formed at its center with an axially extending shaft-receiving opening, fingers extending laterally from said body and each having front and rear side edges, the rear side edges extending radially of the body and the shaft-receiving opening thereof, the front side edges extending laterally from the rear edges of adjoining fingers at right angles thereto and having outer end portions extending towards and intersecting outer ends of the rear edges, and flanges extending along the front edges for the full length thereof and projecting from one surface of the body and at inner ends of the said front side edges having portions extending across the body towards the shaft-receiving opening.

References Cited in the file of this patent

UNITED STATES PATENTS

| Number | Name | Date |
| --- | --- | --- |
| 846,049 | Pearson | Mar. 5, 1907 |
| 957,831 | Wilson | May 10, 1910 |
| 1,002,530 | Legg et al. | Sept. 5, 1911 |
| 1,911,491 | Christiance | May 30, 1933 |